March 13, 1956   D. C. KINNEY   2,737,940
ENGINE COMBUSTION CHAMBER
Filed Nov. 29, 1954
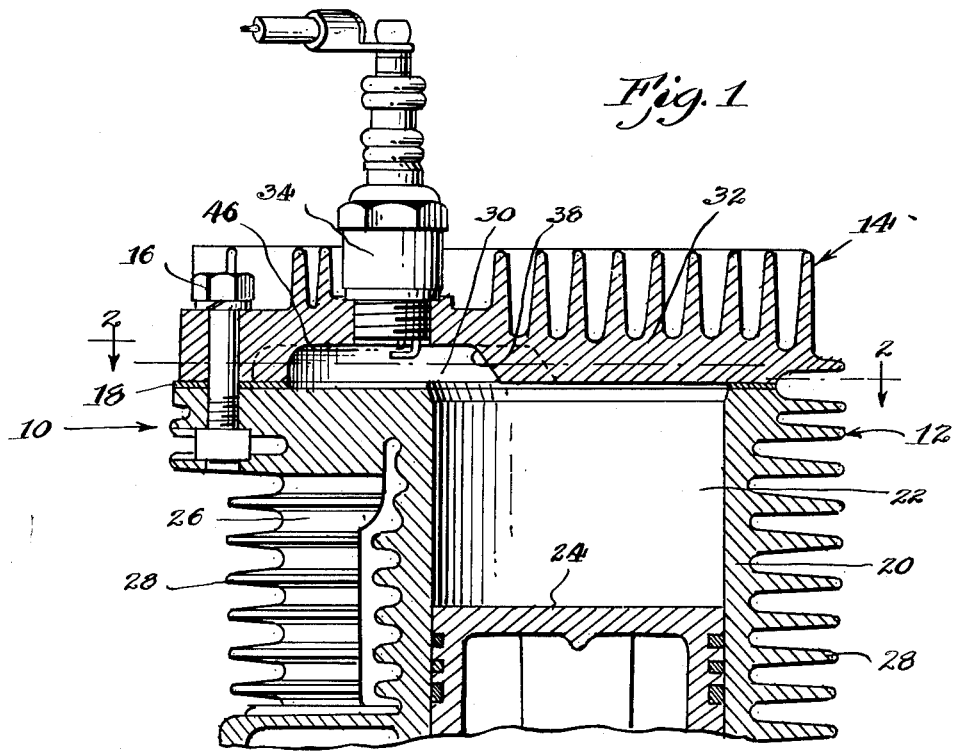
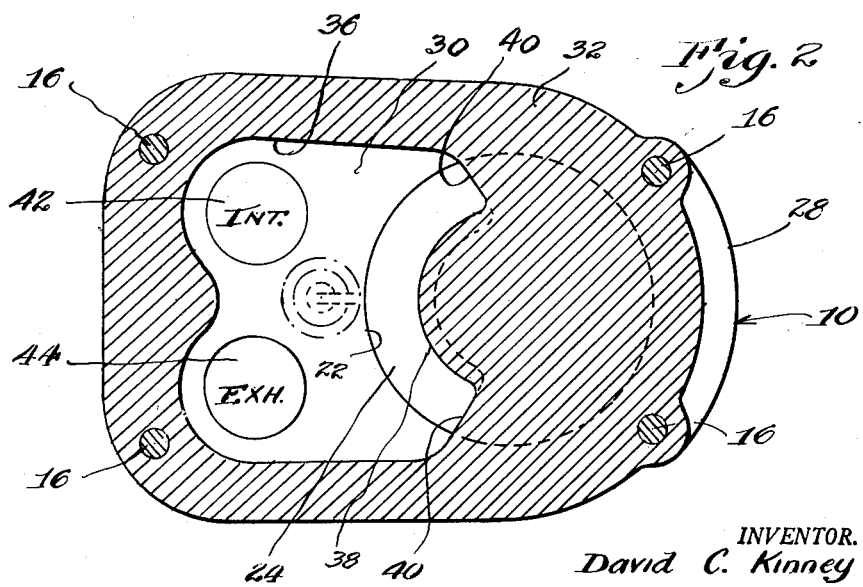
INVENTOR.
David C. Kinney
BY
Hauker Hardesty
Attorneys.

United States Patent Office 2,737,940
Patented Mar. 13, 1956

2,737,940

ENGINE COMBUSTION CHAMBER

David C. Kinney, East Detroit, Mich., assignor to Continental Motors Corporation, Detroit and Muskegon, Mich., a corporation of Virginia Application November 29, 1954, Serial No. 471,690

4 Claims. (Cl. 123—191)

This invention relates to an internal combustion engine assembly embodying a novel and inventive full combustion chamber, and more particularly to a combustion chamber having a cylinder head therefor arranged in a manner to obtain high efficiency in explosion control and consequent power output.

The combustion chamber of this invention embodies a flat plane roof surface in the cylinder head and an arcuate sloping end wall for the chamber portion over the cylinder and remote from the valve section.

This construction provides many advantages in that the fuel stream and gases are uniformly spread throughout the combustion chamber without stratification. The explosive uniform mixture is introduced across the entire surface of the piston by virtue of the arcuate contour, and the sloping end wall in combination with the arcuate contour provides a novel and inventive structure for smooth, efficient power. The arcuate nature of the cylinder head combustion chamber places the explosive fuel mixture across a substantial area of the piston, and the sloping end wall reduces the turbulence of the mixture to a minimum, thus avoiding stratification. The result is smooth, efficient engine operation with a minimum of engine knock, carbonization of fuel, and consequently, a substantially reduced repair incidence.

These are among the objects of the invention provided by the instant structure. Additional objects of the invention will become apparent from the description given below. For a visual understanding of the invention, reference is made to the accompanying drawing in which like parts are referred to by like reference numerals throughout the several views illustrating a preferred embodiment of the invention, and in which Fig. 1 is a fragmentary vertical sectional view of a portion of a cylinder head and cylinder block of internal combustion engine assembly embodying the novel and inventive fuel combustion chamber.

Fig. 2 is a horizontal sectional view of the cylinder head taken substantially on the line 2—2 of Fig. 1.

As shown in the drawing, engine assembly 10 comprises a cylinder block 12 and a cylinder head 14 connected together by bolts 16. A suitable gasket 18 is interposed between the block and head in accordance with the practice long known in this art.

The cylinder block 12 comprises a housing or outer cylinder wall 20, a piston cylinder bore 22, a piston 24, and a valve section 26 adjacent the cylinder housing. The outer cylinder wall 20 and valve section 26 are arranged with fins 28 adapted to cool the engine cylinder block and valve section by air.

The cylinder head 14 comprises the novel and inventive recessed fuel combustion chamber 30 in a head member 32, and an ignition spark plug 34 threadedly mounted in the head member 32. The combustion chamber 30 consists of a recess cavity in the member 32 having a main side wall 36 defining the side and valve section limits of the chamber and an arcuate sloping end wall 38 which is positioned over the cylinder bore 22.

The arcuate end wall 38 is further substantially concentrically arranged over the cylinder bore to provide an even, uniform flow of gases to and away from the cylinder. The chamber walls 40 over the cylinder are substantially radial with respect to the cylinder, to further establish a uniform flow of fuel mixture free of stratification to the piston. The arcuate end wall 38 is also arranged equidistant from the intake and exhaust valves 42 and 44, respectively, and in a manner symmetrical with respect to the valves. The combustion chamber cavity 30 is provided with a flat plane roof 46 over the valves, in the area of the spark plug 34 and over a portion of the cylinder bore 22. The arcuate end wall 38 slopes downward at an angle from the plane roof surface 46 to the cylinder 22.

In operation, the fuel mixture is passed to the combustion chamber 30 by intake valve 42, where it is ignited by a spark from plug 34. Because of the symmetrical nature of the combustion chamber 30 and the arcuate sloping end wall 38, the fuel mixture is subject to a minimum of stratification, which produces a superior ignition of the mixture over the entire area of the chamber, and a more uniform expansion in the cylinder bore against the piston 24.

The internal combustion engine here disclosed as a single cylinder may be multiple in character, in accordance with the requirements of a particular engine application, and is not limited to a single cylinder engine. The valve construction and operation may be in those forms particularly adaptable and suitable to internal combustion engines and are not limited to the arrangement here shown in meager detail. These features of the disclosure and description are correlative to the invention which relates to the fuel combustion chamber 30.

It will be apparent to those skilled in the art to which this invention pertains that various modifications and changes may be made without departing from the spirit of the invention or from the scope of the appended claims.

I claim:

1. In an internal combustion engine having a cylinder block provided with a cylinder, a piston operable in said cylinder, a cylinder head structure secured to the engine block and provided with a combustion chamber overlying a part of the block and cylinder, intake and exhaust valves opening into said combustion chamber, said combustion chamber defined by substantially vertical plane side walls, a flat plate roof and a convex arcuate end wall overlying the cylinder and constructed concentrically therewith, said arcuate end wall formed of a substantially conical surface such that any plane containing the cylinder axis and intersecting said end wall will thereby intersect same in substantially a straight line, said vertical side walls each provided with converging end portions disposed in planes extending substantially radially with respect to the cylinder axis and forming a junction with the said convex arcuate end wall of the combustion chamber, said combustion chamber thus constructed symmetrical with respect to an engine plane containing the cylinder axis and extending medially of said side walls.

2. In an internal combustion engine having a cylinder block provided with a cylinder, a piston operable in said cylinder, a cylinder head structure secured to the engine block and provided with a combustion chamber overlying a part of the block and cylinder, intake and exhaust valves opening into said combustion chamber, said combustion chamber defined by substantially vertical plane side walls, a flat plane roof and a convex arcuate end wall overying the cylinder and constructed concentrically therewith, said arcuate end wall formed of a substantially conical surface such that any plane containing the cylinder axis and intersecting said end wall will thereby intersect same in substantially a straight line, said vertical side walls each provided with converging end portions disposed in planes extending substantially radially with respect to the cylinder axis and forming a junction with the said convex arcuate end wall of the combustion chamber, said combustion chamber thus constructed symmetrically with respect to an engine plane containing the cylinder axis and extending medially of said side walls, said converging end portions of said side walls formed at an obtuse angle with respect to the major portion of said side walls.

3. In an internal combustion engine having a cylinder block provided with a cylinder, a piston operable in said cylinder, a cylinder head structure secured to the engine block and provided with a combustion chamber overlying a part of the block and cylinder, intake and exhaust valves opening into said combustion chamber, said combustion chamber defined by substantially vertical plane side walls, a flat plane roof and a convex arcuate end wall overlying the cylinder and constructed concentrically therewith, said arcuate end wall formed of a substantially conical surface such that any plane containing the cylinder axis and intersecting said end wall will thereby intersect same in substantially a straight line, said vertical side walls each provided with converging end portions disposed in planes extending substantially radially with respect to the cylinder axis and forming a junction with the said convex arcuate end wall of the combustion chamber, said combustion chamber thus constructed symmetrical with respect to an engine plane containing the cylinder axis and extending medially of said side walls, the engine plane extending medially of the side walls being disposed equidistant from said intake and exhaust valves.

4. In an internal combustion engine having a cylindrical block provided with a cylinder, a piston operable in said cylinder, a cylinder head structure secured to the engine block and provided with a combustion chamber overlying a part of the block and cylinder, intake and exhaust valves opening into said combustion chamber, said combustion chamber defined by substantially vertical plane side walls, a flat plane roof and a convex arcuate end wall overlying the cylinder and constructed concentrically therewith, said arcuate end wall formed of a substantially conical surface such that any plane containing the cylinder axis and intersecting said end wall will thereby intersect same in substantially a straight line, said vertical side walls each provided with converging end portions disposed in planes extending substantially radially with respect to the cylinder axis and forming a junction with the said convex arcuate end wall of the combustion chamber, said combustion chamber thus constructed symmetrical with respect to an engine plane containing the cylinder axis and extending medially of said side walls, said side walls defining the area of the flat plane roof over said valves, said side wall end portions and said arcuate end wall defining a uniformly arcuate opening between the combustion chamber and the cylinder.

References Cited in the file of this patent

UNITED STATES PATENTS

| | | |
|---|---|---|
| 1,474,003 | Ricardo | Nov. 13, 1923 |
| 1,749,327 | Earnshaw et al. | Mar. 4, 1930 |
| 2,030,663 | Summers | Feb. 11, 1936 |

FOREIGN PATENTS

| | | |
|---|---|---|
| 371,852 | Great Britain | Apr. 20, 1932 |